United States Patent
Mishima et al.

(10) Patent No.: US 9,999,872 B2
(45) Date of Patent: Jun. 19, 2018

(54) EXHAUST GAS PURIFYING CATALYST, EXHAUST GAS PURIFICATION DEVICE AND FILTER, AND METHOD FOR PRODUCING SAID CATALYST

(71) Applicant: OTSUKA CHEMICAL CO., LTD., Osaka, Osaka (JP)

(72) Inventors: Takahiro Mishima, Tokushima (JP); Masatoshi Uetani, Tokushima (JP)

(73) Assignee: OTSUKA CHEMICAL CO., LTD., Osaka (JP)

( * ) Notice: Subject to any disclaimer, the term of this patent is extended or adjusted under 35 U.S.C. 154(b) by 0 days. days.

(21) Appl. No.: 15/316,876

(22) PCT Filed: Jun. 11, 2015

(86) PCT No.: PCT/JP2015/066870
§ 371 (c)(1),
(2) Date: Dec. 7, 2016

(87) PCT Pub. No.: WO2015/194451
PCT Pub. Date: Dec. 23, 2015

(65) Prior Publication Data
US 2017/0157596 A1 Jun. 8, 2017

(30) Foreign Application Priority Data

Jun. 19, 2014 (JP) .................................. 2014-126409
Jan. 5, 2015 (JP) .................................. 2015-000357

(51) Int. Cl.
*B01J 21/02* (2006.01)
*B01J 21/06* (2006.01)
(Continued)

(52) U.S. Cl.
CPC ............ *B01J 27/055* (2013.01); *B01D 53/94* (2013.01); *B01J 37/04* (2013.01); *F01N 3/021* (2013.01);
(Continued)

(58) Field of Classification Search
CPC . B01J 27/055; B01J 21/02; B01J 21/06; B01J 23/02; B01J 23/04; B01J 37/04;
(Continued)

(56) References Cited

U.S. PATENT DOCUMENTS 2,826,477 A * 3/1958 Rau .......................... C14C 3/04
                                                    8/94.21
3,459,494 A * 8/1969 Harris ................ B01D 53/9413
                                                    423/239.1
(Continued)

FOREIGN PATENT DOCUMENTS

EP     1941945 A2    7/2008
GB     2355943 A     5/2001
(Continued)

OTHER PUBLICATIONS

International Search Report dated Aug. 18, 2015, issued in counterpart application No. PCT/2015/066870. (2 pages).
(Continued)

*Primary Examiner* — Patricia L. Hailey
(74) *Attorney, Agent, or Firm* — Westerman, Hattori, Daniels & Adrian, LLP (57) ABSTRACT

Provided are an exhaust gas purifying catalyst having high catalytic activity enabling combustion of PM at low temperatures and free from any risk of dispersal of metal elements arousing concern about environmental load, an exhaust gas purification device and filter having a high combustion efficiency of PM, and a method for producing the catalyst. An exhaust gas purifying catalyst contains: an (Continued)

oxide containing at least one element (A) selected from alkali metals and alkaline earth metals and at least one element (B) selected from Zr, Si, Al, and Ti; and a cesium salt.

12 Claims, 1 Drawing Sheet

(51) Int. Cl.
| | |
|---|---|
| *B01J 23/02* | (2006.01) |
| *B01J 23/04* | (2006.01) |
| *B01J 37/04* | (2006.01) |
| *B01J 27/055* | (2006.01) |
| *B01D 53/94* | (2006.01) |
| *F01N 3/021* | (2006.01) |
| *F01N 3/20* | (2006.01) |
| *F01N 3/28* | (2006.01) |

(52) U.S. Cl.
CPC .......... *F01N 3/204* (2013.01); *F01N 3/2842* (2013.01); *B01D 2255/202* (2013.01); *B01D 2255/2022* (2013.01); *B01D 2255/2092* (2013.01); *B01D 2255/20707* (2013.01); *B01D 2255/20715* (2013.01); *B01D 2255/30* (2013.01); *B01D 2255/915* (2013.01)

(58) Field of Classification Search
CPC ........ B01D 2255/202; B01D 2255/204; B01D 2255/20707; B01D 2255/20715; B01D 2255/2092; B01D 2255/30; B01D 2255/40; B01D 2255/915
USPC .............. 502/218, 240, 242, 243; 423/213.2, 423/239.1
See application file for complete search history.

(56) References Cited

U.S. PATENT DOCUMENTS

| | | | | |
|---|---|---|---|---|
| 4,426,365 A | * | 1/1984 | Magder .............. | B01D 53/1493 252/189 |
| 5,049,364 A | * | 9/1991 | Yoshimoto ......... | B01D 53/8628 423/213.5 |
| 5,338,715 A | * | 8/1994 | Iida .................... | B01D 53/945 423/212 |
| 5,643,542 A | * | 7/1997 | Leyrer ................. | B01D 53/945 423/212 |
| 6,110,860 A | | 8/2000 | Inoue et al. | |
| 6,143,272 A | * | 11/2000 | Narula .................. | B01D 53/94 423/213.2 |
| 6,217,837 B1 | * | 4/2001 | Narula ............... | B01D 53/9422 423/212 |
| 6,335,305 B1 | * | 1/2002 | Suzuki ................. | B01D 53/945 502/325 |
| 6,350,421 B1 | * | 2/2002 | Strehlau ............. | B01D 53/9422 423/213.2 |
| 6,395,675 B1 | * | 5/2002 | Suga .................... | B01D 53/945 502/302 |
| 8,454,917 B2 | * | 6/2013 | Hoyer ................ | B01D 53/9422 423/213.2 |
| 2002/0039966 A1 | * | 4/2002 | Tanaka ..................... | B01J 23/40 502/332 |
| 2004/0115104 A1 | * | 6/2004 | Iizuka ................ | B01D 53/8628 422/177 |
| 2009/0031712 A1 | * | 2/2009 | McGinn ............... | B01D 53/944 60/299 |
| 2009/0163356 A1 | * | 6/2009 | Nilsson ................ | B01D 53/944 502/178 |
| 2013/0171036 A1 | * | 7/2013 | Mori .................... | B01D 53/944 422/180 |
| 2015/0056106 A1 | * | 2/2015 | Uetani ..................... | B01J 23/04 422/180 |

FOREIGN PATENT DOCUMENTS

| | | | | |
|---|---|---|---|---|
| JP | 10-118490 A | | 5/1998 | |
| JP | 10-137590 A | | 5/1998 | |
| JP | 2003-210992 | * | 7/2003 | ........... B01J 27/232 |
| JP | 2003-210992 A | | 7/2003 | |
| JP | 2004-216305 A | | 8/2004 | |
| JP | 2008183552 A | | 8/2008 | |
| WO | 2013/136991 A1 | | 9/2013 | |

OTHER PUBLICATIONS

Notification of Transmittal of Translation of the International Preliminary Report on Patentability (Form PCT/IB/338) issued in counterpart International Application No. PCT/JP2015/066870, dated Dec. 29, 2016, with Forms PCT/IB/373 and PCT/ISA/237. (6 pages).

Extended European Search Report dated Jan. 12, 2018, issued in Application No. 15808920.1.

* cited by examiner

EXHAUST GAS PURIFYING CATALYST, EXHAUST GAS PURIFICATION DEVICE AND FILTER, AND METHOD FOR PRODUCING SAID CATALYST

TECHNICAL FIELD

This invention relates to exhaust gas purifying catalysts for combusting particulate matter (PM) contained in exhaust gases, exhaust gas purification devices and filters, and methods for producing the catalysts.

BACKGROUND ART

Conventional methods for removing PM contained in exhaust gases emitted from an internal combustion engine, such as a diesel engine, include the method of placing a honeycomb filter made of a heat-resistant ceramic, such as silicon carbide, aluminum titanate or cordierite, in an exhaust system, collecting PM on the honeycomb filter to remove PM from the exhaust gases, and then, upon deposition of a predetermined amount of PM thereon, applying heat to the honeycomb filter to decompose PM by combustion.

However, the combustion temperature of PM is as high as 550 to 650° C., which presents the problem that a device for purifying exhaust gases has a large overall size and the problem that the energy cost for heat application becomes high. Therefore, a honeycomb filter is generally used in which a catalyst for combusting PM is supported on its surface.

With this method, the combustion temperature of PM can be reduced by catalysis, so that the energy taken to apply heat to the honeycomb filter can be reduced. Precious metals, such as platinum, are known as such catalysts, but the amount of production thereof is extremely small, which carries a risk of significant variations in supply-demand balance and price.

To cope with this, Patent Literature 1 proposes an exhaust gas purifying catalyst made of at least one of silicates, aluminates, and zirconates of alkali metals. Patent Literature 2 proposes an exhaust gas purifying catalyst that contains a metal oxide and a sulfate of an alkali metal and/or a sulfate of an alkaline earth metal. Patent Literature 3 proposes an exhaust gas purifying catalyst that is composite oxide particles containing an alkali metal, Si, and Zr.

CITATION LIST

Patent Literature

Patent Literature 1: JP-A-H10-118490
Patent Literature 2: JP-A-H10-137590
Patent Literature 3: WO2013/136991

SUMMARY OF INVENTION

Technical Problem

However, the exhaust gas purifying catalysts proposed in Patent Literatures 1, 2, and 3 are insufficient in catalytic effect. Furthermore, as for Patent Literature 2, metal elements (such as Cu and V) arousing concern about environmental load in relation to catalysts for vehicles are used, which presents the problem that the risk of dispersal of metal elements arousing concern about environmental load has not been eliminated.

An object of the present invention is to provide an exhaust gas purifying catalyst having high catalytic activity enabling combustion of PM at low temperatures and free from any risk of dispersal of metal elements arousing concern about environmental load, an exhaust gas purification device and filter having a high combustion efficiency of PM, and a method for producing the catalyst.

Solution to Problem

The inventors conducted intensive studies to solve the above problems and thus found that an exhaust gas purifying catalyst containing an oxide having a particular composition and a cesium salt has high catalytic activity enabling combustion of PM at low temperatures. Based on this founding, the inventors further conducted studies and finally completed the present invention.

Specifically, the present invention provides the following exhaust gas purifying catalyst, exhaust gas purification device and filter, and method for producing the catalyst.

Aspect 1:
An exhaust gas purifying catalyst containing: an oxide containing at least one element (A) selected from alkali metals and alkaline earth metals and at least one element (B) selected from Zr, Si, Al, and Ti; and a cesium salt.

Aspect 2
The exhaust gas purifying catalyst according to aspect 1, having a mixture ratio between the oxide and the cesium salt (oxide/cesium salt) of 0.01 to 100 by mass.

Aspect 3
The exhaust gas purifying catalyst according to aspect 1 or 2, wherein the cesium salt is at least one selected from cesium sulfate, cesium nitrate, cesium carbonate, and cesium chloride.

Aspect 4
The exhaust gas purifying catalyst according to aspect 1 or 3, further containing a potassium salt.

Aspect 5
The exhaust gas purifying catalyst according to aspect 4, wherein the potassium salt is at least one selected from potassium sulfate, potassium nitrate, potassium carbonate, and potassium chloride.

Aspect 6
The exhaust gas purifying catalyst according to aspect 4 or 5, having a mixture ratio between the oxide and the potassium and cesium salts (oxide/(potassium salt+cesium salt)) of 0.01 to 100 by mass.

Aspect 7
The exhaust gas purifying catalyst according to any one of aspects 4 to 6, having a mixture ratio between the potassium salt and the cesium salt (potassium salt/cesium salt) of 0.01 to 100 by mass.

Aspect 8
The exhaust gas purifying catalyst according to any one of aspects 1 to 7, having a molar ratio between the element (A) and the element (B) of the oxide (A/B) of a positive real number equal to or greater than $1/8$.

Aspect 9
The exhaust gas purifying catalyst according to any one of aspects 1 to 8, being capable of combusting particulate matter contained in exhaust gases.

Aspect 10
An exhaust gas purification device including the exhaust gas purifying catalyst according to any one of aspects 1 to 9.

Aspect 11

An exhaust gas purification filter including: a support; and the exhaust gas purifying catalyst according to any one of aspects 1 to 9, the exhaust gas purifying catalyst being supported on the support.

Aspect 12

The exhaust gas purification filter according to aspect 11, wherein the support is a honeycomb filter.

Aspect 13

A method for producing the exhaust gas purifying catalyst according to any one of aspects 1 to 3, 8, and 9, the method including mixing and dispersing the oxide and the cesium salt.

Aspect 14

A method for producing the exhaust gas purifying catalyst according to any one of aspects 4 to 9, the method including mixing and dispersing the oxide, the potassium salt, and the cesium salt.

Advantageous Effects of Invention

The present invention can provide an exhaust gas purifying catalyst having high catalytic activity enabling combustion of PM at low temperatures and free from any risk of dispersal of metal elements arousing concern about environmental load, and an exhaust gas purification device and filter having a high combustion efficiency of PM.

DESCRIPTION OF EMBODIMENTS

Hereinafter, a description will be given of an example of a preferred embodiment for working of the present invention. However, the following embodiment is simply illustrative. The present invention is not at all intended to be limited to the following embodiment.

An exhaust gas purifying catalyst according to the present invention contains: an oxide containing at least one element (A) selected from alkali metals and alkaline earth metals and at least one element (B) selected from Zr, Si, Al, and Ti; and a cesium salt. Since an oxide having a particular composition and a cesium salt are mixed, a synergy effect of the oxide of Zr, Si, Al or Ti containing an alkali metal or an alkaline earth metal in its crystals with the cesium salt can increase the catalytic activity of the overall mixture to improve the combustion efficiency of PM, although the reason for this is not clear. Furthermore, by the above-described structure, an exhaust gas purifying catalyst having high catalytic activity can be provided even without the use of metal elements arousing concern about environmental load, such as Cu or V.

The exhaust gas purifying catalyst according to the present invention may further contain a potassium salt as necessary.

(Oxide)

The oxide for use in the exhaust gas purifying catalyst according to the present invention is an oxide containing at least one element (A) selected from alkali metals and alkaline earth metals and at least one element (B) selected from Zr, Si, Al, and Ti.

When the element (A) of the oxide is an alkali metal, the molar ratio between the element (A) and the element (B) (A/B) is preferably a positive real number equal to or greater than $1/8$, more preferably from $1/8$ to 6, and still more preferably from $1/6$ to 3.

More specifically, the oxide can be represented by a general formula of $A_{2X}Zr_XSi_YO_{3X+2Y}$, $A_XAl_YSi_ZO_{X/2+3Y/2+2Z}$, $A_{2X}Ti_XSi_YO_{3X+2Y}$, $A_XAl_YTi_ZO_{X/2+3Y/2+2Z}$, $A_{2X}Ti_YO_{X+2Y}$, $A_{2X}Zr_YO_{X+2Y}$, $A_XAl_YO_{X/2+3Y/2}$ or so on. In the formula, A represents an alkali metal and X, Y, and Z each represent a positive real number.

Furthermore, examples of the oxide include those that can be represented by a general formula of $A_XM_Y\square_ZTi_{2-(Y+Z)}O_4$ or so on. In the formula, A represents an alkali metal, M represents a monovalent to trivalent metal different from A, and $\square$ represents a defective site of Ti. X represents a positive real number satisfying $0<X<1.0$ and Y and Z each represent zero or a positive real number that satisfy $0<Y+Z<1.0$.

Examples of the alkali metal include Li, Na, K, Rb, Cs, and Fr. Preferred among them are Li, Na, K, and Cs because of their economic advantage.

Examples of $A_{2X}Zr_XSi_YO_{3X+2Y}$ that can be cited include $Li_2ZrSiO_5$, $Na_2ZrSiO_5$, $Na_4Zr_2Si_3O_{12}$, $Na_2ZrSi_2O_7$, $Na_2ZrSi_3O_9$, $K_2ZrSiO_5$, $K_2ZrSi_2O_7$, $K_2ZrSi_3O_9$, $Cs_4Zr_2Si_3O_{12}$, $Cs_2ZrSi_2O_7$, and $Cs_2ZrSi_3O_9$.

Examples of $A_XAl_YSi_ZO_{X/2+3Y/2+2Z}$ that can be cited include $LiAlSiO_4$, $LiAlSi_2O_6$, $LiAlSi_3O_8$, $Na_4Al_2Si_2O_9$, $Na_6Al_4Si_4O_{17}$, $NaAlSiO_4$, $NaAlSi_2O_6$, $NaAlSi_3O_8$, $KAlSiO_4$, $KAlSi_2O_6$, and $KAlSi_3O_8$.

Examples of $A_{2X}Ti_XSi_YO_{3X+2Y}$ that can be cited include $Li_2TiSiO_5$, $Li_2TiSi_2O_7$, $Li_2TiSi_3O_9$, $Na_2TiSiO_5$, $Na_2TiSi_2O_7$, $Na_2TiSi_3O_9$, $K_2TiSiO_5$, $K_2TiSi_2O_7$, and $K_2TiSi_3O_9$.

Examples of $A_XAl_YTi_ZO_{X/2+3Y/2+2Z}$ that can be cited include $Li_2Al_2Ti_4O_{12}$, $Na_4Al_3Ti_{0.75}O_8$, $Na_2Al_2Ti_6O_{16}$, $NaTi_2Al_5O_{12}$, $K_{1.5}(Al_{1.5}Ti_{6.5})O_{16}$, and $CsAlTiO_4$.

Examples of $A_{2X}Ti_YO_{X+2Y}$ that can be cited include $Na_4TiO_4$, $Na_2TiO_3$, $Na_2Ti_2O_5$, $Na_2Ti_4O_9$, $Na_2Ti_6O_{13}$, $Na_2Ti_8O_{17}$, $K_4TiO_4$, $K_2TiO_3$, $K_2Ti_2O_5$, $K_2Ti_4O_9$, $K_2Ti_6O_{13}$, and $K_2Ti_8O_{17}$.

Examples of $A_{2X}Zr_YO_{X+2Y}$ that can be cited include $Na_2ZrO_3$ and $K_2ZrO_3$.

Examples of $A_XAl_YO_{X/2+3Y/2}$ that can be cited include $NaAlO_2$, $NaAl_5O_8$, $KAlO_2$, and $KAl_5O_8$.

Examples of $A_XM_Y\square_ZTi_{2-(Y+Z)}O_4$ that can be cited include $K_{0.8}Li_{0.27}Ti_{1.73}O_4$ and $K_{0.8}Mg_{0.4}Ti_{1.6}O_4$.

When the element (A) of the oxide is an alkaline earth metal, the molar ratio between the element (A) and the element (B) (A/B) is preferably a positive real number equal to or greater than $1/8$, more preferably from $1/8$ to 6, and still more preferably from $1/3$ to 4.

More specifically, the oxide can be represented by a general formula of $A_XAl_YO_{X+3Y/2}$, $A_XTi_YO_{X+2Y}$, $A_XAl_YSi_ZO_{X+3Y/2+2Z}$, $A_XZr_YO_{X+2Y}$, $A_XSi_YO_{X+2Y}$, $A_XZr_YSi_ZO_{X+2Y+2Z}$ or so on. In the formula, A represents at least one alkaline earth metal and X, Y, and Z each represent a positive real number.

Examples of the alkaline earth metal include Be, Mg, Ca, Sr, Ba, and Ra. Preferred among them are Mg, Ca, Sr, and Ba because of their economic advantage.

Examples of $A_XAl_YO_{X+3Y/2}$ that can be cited include $MgAl_2O_4$, $Ca_3Al_2O_6$, $Ca_2Al_2O_5$, $CaAl_2O_4$, $Sr_5Al_2O_8$, $Sr_4Al_2O_7$, $Sr_3Al_2O_6$, $SrAl_2O_4$, $Sr_2Al_6O_{11}$, $Ba_{10}Al_2O_{13}$, $Ba_5Al_2O_8$, $Ba_4Al_2O_7$, $Ba_3Al_2O_6$, $Ba_2Al_2O_5$, and $BaAl_2O_4$.

Examples of $A_XTi_YO_{X+2Y}$ that can be cited include $Mg_2TiO_4$, $MgTiO_3$, $MgTi_2O_5$, $Ca_3Ti_2O_7$, $CaTiO_3$, $CaTi_2O_5$, $Sr_2TiO_4$, $Sr_3Ti_2O_7$, $SrTiO_3$, $Sr_2Ti_5O_{12}$, $Ba_2TiO_4$, and $Ba_2Ti_5O_{12}$.

Examples of $A_XAl_YSi_ZO_{X+3Y/2+2Z}$ that can be cited include $Mg_3Al_2Si_3O_{12}$, $Ca_2Al_2SiO_7$, $Ca_3Al_2Si_3O_{12}$, $CaAl_2SiO_6$, $Sr_2Al_2SiO_7$, $Ba_3Al_2Si_3O_{12}$, and $BaAl_2SiO_6$.

Examples of $A_XZr_YO_{X+2Y}$ that can be cited include $Mg_2Zr_5O_{12}$, $CaZrO_3$, $Sr_2ZrO_4$, $Sr_3Zr_2O_7$, $SrZrO_3$, $Ba_2ZrO_4$, $Ba_3Zr_2O_7$, and $BaZrO_3$.

Examples of $A_XSi_YO_{X+2Y}$ that can be cited include $Mg_2SiO_4$, $MgSiO_3$, $Ca_2SiO_4$, $CaSiO_3$, $CaSi_2O_5$, $Sr_3SiO_5$, $Sr_2SiO_4$, $SrSiO_3$, $Ba_3SiO_5$, $Ba_2SiO_4$, $BaSiO_3$, and $BaSi_2O_5$.

Examples of $A_XZr_YSI_ZO_{X+2Y+2Z}$ that can be cited include $Ca_3ZrSi_2O_9$, $CaZrSi_2O_7$, $Ca_2Zr_4SiO_{12}$, $Sr_7ZrSi_6O_{21}$, $SrZrSi_2O_7$, and $Ba_2Zr_2Si_3O_{12}$.

The oxide for use in the present invention can contain other elements without impairing its excellent characteristics. Examples of other elements that can be cited include Fe, Nb, Ce, Y, P, La, and Sm. The content rate of other elements is preferably within the range of 0.1 to 30.0% by mole.

The oxide for use in the present invention is preferably substantially free of Cu, V, Cr, Mn, Co, and Ni. The term "substantially free of" means that the content rate thereof is 0.1% by mole or less.

Although no particular limitation is placed on the method for producing the oxide for use in the present invention, the oxide can be produced, for example, by selecting source materials from alkali metal salts, alkaline earth metal salts, zirconium sources, silicon sources, aluminum sources, and titanium sources as appropriate according to the desired composition of a resultant compound, mixing the source materials, and firing them. The firing temperature is preferably within the range of 700 to 1300° C. and more preferably within the range of 800 to 1200° C.

The alkali metal salts include alkali metal carbonates; alkali metal hydrogen carbonates; alkali metal hydroxides; alkali metal organic acid salts, such as alkali metal acetates; alkali metal sulfates; and alkali metal nitrates, and the preferred are alkali metal carbonates.

The alkaline earth metal salts include alkaline earth metal carbonates; alkaline earth metal hydrogen carbonates; alkaline earth metal hydroxides; alkaline earth metal organic acid salts, such as alkaline earth metal acetates; alkaline earth metal sulfates; and alkaline earth metal nitrates, and the preferred are alkaline earth metal carbonates.

Although no particular limitation is placed on the zirconium source so long as it is a source material containing elemental zirconium and not interfering with the production of the oxide by firing, examples include compounds that can be led to zirconium oxide by firing in air. Examples of such compounds include zirconium oxide, zirconium carbonate hydrate, and zirconium sulfate hydrate and the preferred is zirconium oxide.

Although no particular limitation is placed on the silicon source so long as it is a source material containing elemental silicon and not interfering with the production of the oxide by firing, examples include compounds that can be led to silicon oxide by firing in air. Examples of such compounds include silicon oxide and silicon and the preferred is silicon oxide.

Although no particular limitation is placed on the aluminum source so long as it is a source material containing elemental aluminum and not interfering with the production of the oxide by firing, examples include compounds that can be led to aluminum oxide by firing in air. Examples of such compounds include aluminum oxide, aluminum carbonate hydrate, and aluminum sulfate hydrate and the preferred is aluminum oxide.

Although no particular limitation is placed on the titanium source so long as it is a source material containing elemental titanium and not interfering with the production of the oxide by firing, examples include compounds that can be led to titanium oxide by firing in air. Examples of such compounds include titanium oxide, rutile ores, wet cake of titanium hydroxide, and aqueous titania and the preferred is titanium oxide.

If oxides that can be used in the present invention are commercially available, they can be used.

(Cesium Salt)

More specifically, examples of the cesium salt for use in the exhaust gas purifying catalyst according to the present invention include cesium sulfate, cesium nitrate, cesium carbonate, and cesium chloride. From the viewpoint of thermal resistance, cesium sulfate and cesium chloride are preferred.

(Potassium Slat)

More specifically, examples of the potassium salt for use in the exhaust gas purifying catalyst according to the present invention include potassium sulfate, potassium nitrate, potassium carbonate, and potassium chloride. From the viewpoint of thermal resistance, potassium sulfate and potassium chloride are preferred.

(Method for Producing Exhaust Gas Purifying Catalyst)

A method for producing an exhaust gas purifying catalyst according to the present invention includes mixing and dispersing the oxide and the cesium salt. Mixing methods that can be used are known methods without particular limitation so long as they can mix and disperse the oxide and the cesium salt (or the oxide, the potassium salt, and the cesium salt). Mixing methods that can be cited include dry mixing and wet mixing.

Examples of the dry mixing that can be cited include methods for mixing the oxide and the cesium salt (or the oxide, the potassium salt, and the cesium salt) using a mortar, a rotary powder mixer, a stationary powder mixer, a combined powder mixer or the like.

Examples of the wet mixing that can be cited include methods for mixing a product obtained by dissolving or dispersing the oxide and the cesium salt (or the oxide, the potassium salt, and the cesium salt) in water or a suitable solvent and drying the mixed product. Alternatively, the wet mixing may be the method of making a solution containing the cesium salt (or the potassium salt and the cesium salt) dissolved therein in contact with the oxide, followed by drying.

The product obtained by the above-described production method can be used as an exhaust gas purifying catalyst according to the present invention or can also be used by granulating or grinding it into arbitrary form, as necessary.

In mixing the oxide and the cesium salt, there is no particular limitation as to the mixture ratio between the oxide and the cesium salt (oxide/cesium salt) and the mixture ratio may be appropriately selected according to the desired properties or usage of a resultant exhaust gas purifying catalyst. However, the mixture ratio is, by mass, normally 0.01 to 100, preferably 0.1 to 50, and more preferably 0.25 to 10.

In mixing the oxide, the potassium salt, and the cesium salt, there is no particular limitation as to the mixture ratio between the oxide and the potassium and cesium salts (oxide/(potassium salt+cesium salt)) and the mixture ratio may be appropriately selected according to the desired properties or usage of a resultant exhaust gas purifying catalyst. However, the mixture ratio is, by mass, normally 0.01 to 100, preferably 0.1 to 50, and more preferably 0.25 to 10. There is no particular limitation as to the mixture ratio between the potassium salt and the cesium salt (potassium salt/cesium salt) and the mixture ratio may be appropriately selected according to the desired properties or usage of a resultant exhaust gas purifying catalyst. However, the mixture ratio is, by mass, normally 0.01 to 100, preferably 0.1 to 50, and more preferably 0.25 to 10.

In the exhaust gas purifying catalyst according to the present invention, a combination of at least one of additives like those used in known exhaust gas purifying catalysts can be incorporated so long as the excellent characteristics of the exhaust gas purifying catalyst are not impaired. Examples of such additives that can be cited include precious metal catalysts, such as Pt, Rh, and Pd, oxidation catalysts, alkali metal salts, and alkaline earth metal salts.

(Exhaust Gas Purification Device)

An exhaust gas purification device according to the present invention includes the above-described exhaust gas purifying catalyst according to the present invention. Therefore, the exhaust gas purification device has high catalytic activity enabling combustion of PM at low temperatures and is free from any risk of dispersal of metal elements arousing concern about environmental load.

Figure 1:
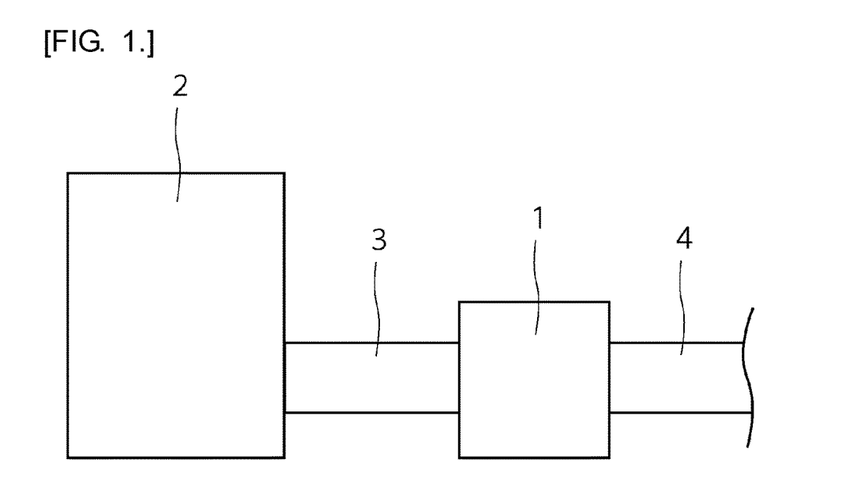
FIG. 1 is a schematic view showing an exhaust gas purification device of one embodiment according to the present invention.

FIG. 1 is a schematic view showing an exhaust gas purification device of one embodiment according to the present invention. The exhaust gas purification device 1 is connected to a source 2 of exhaust gases through a pipe 3, so that gases emitted from the source 2 of exhaust gases pass through the pipe 3 and are sent to the exhaust gas purification device 1. After the exhaust gases are purified in the exhaust gas purification device 1, the purified gases are emitted through a pipe 4. Examples of the source 2 of exhaust gases include internal combustion engines, such as diesel engines and gasoline engines.

Examples of the exhaust gas purification device according to the present invention that can be cited include those equipped with an exhaust gas purification filter according to the present invention.

Conventionally known supports can be used as the support for the exhaust gas purification filter without particular limitation so long as they have a filtration function. An example of the support is a honeycomb filter. Specifically, a wall-flow honeycomb filter made of ceramic is preferably used. The materials for the support that are preferably used include silicon carbide, cordierite, mullite, alumina, and aluminum titanate. In the case of the wall-flow honeycomb filter, no particular limitation is placed on the number of cells and the wall thickness. Furthermore, no particular limitation is placed on the type of the cell wall surface so long as it is a porous wall.

The exhaust gas purification filter according to the present invention includes a support and the exhaust gas purifying catalyst supported on the support and can be used by supporting the exhaust gas purifying catalyst on the surface of the support, the wall surfaces of the cells, the pores, and so on.

Examples of the method for supporting the exhaust gas purifying catalyst on the support include the immersion method and the spraying method. For example, in the immersion method, the exhaust gas purifying catalyst can be supported on the support by preparing a slurry from the exhaust gas purifying catalyst together with a binder, a dispersant, and so on, immersing the support into the prepared catalyst slurry, picking up the support from the slurry, drying it, and then removing organic components by firing at 300 to 800° C.

Alternatively, as another method for supporting the exhaust gas purifying catalyst on the support, the exhaust gas purifying catalyst can be supported on the support by mixing ceramic particles as a source material of the support with the exhaust gas purifying catalyst according to the present invention, a pore-forming agent, and so on, forming the mixture into the shape of the support, and then firing the formed shape. Still alternatively, the exhaust gas purifying catalyst can also be supported on the support by mixing ceramic particles as a source material of the support with a source material of the exhaust gas purifying catalyst according to the present invention, a pore-forming agent, and so on, forming the mixture into the shape of the support, firing the formed shape, and then depositing the remaining source material of the exhaust gas purifying catalyst on the support by immersion, spraying or other processes.

The amount of the exhaust gas purifying catalyst according to the present invention supported on the support can be appropriately selected depending upon the desired filtering capability. For example, the exhaust gas purifying catalyst according to the present invention can be used within the range of 0.1 to 50 parts by mass, preferably 0.5 to 40 parts by mass, more preferably 0.5 to 30 parts by mass, still more preferably 1 to 35 parts by mass, and yet more preferably 1 to 25 parts by mass, relative to 100 parts by mass of the support.

The exhaust gas purifying catalyst according to the present invention can combust PM at low temperatures and is free from any risk of dispersal of metal elements arousing concern about environmental load. For this reason, the exhaust gas purification filter with the exhaust gas purifying catalyst according to the present invention supported thereon has a high combustion efficiency of PM, can prevent deterioration of the catalyst owing to high temperatures during abnormal combustion, and has low environmental load. The exhaust gas purification filter according to the present invention, because of its excellent features, can be suitably used as a filter for a diesel engine (DPF), a filter for a gasoline engine or the like for the purpose of removing PM contained in exhaust gases emitted from such an internal combustion engine.

EXAMPLES

The present invention will be described below in further detail with reference to examples. The present invention is not at all limited by the following examples and modifications and variations may be appropriately made therein without changing the gist of the invention.

Synthesis of Oxide

Synthesis Example 1

An amount of 36.6 parts by mass of sodium carbonate, 42.6 parts by mass of zirconium oxide, and 20.8 parts by mass of silicon oxide were mixed and the mixture was fired at 1200° C. for four hours. The resultant particulate solid was confirmed to be single-phase $Na_2ZrSiO_5$ by X-ray diffractometry.

Synthesis Example 2

An amount of 33.2 parts by mass of sodium carbonate, 38.6 parts by mass of zirconium oxide, and 28.2 parts by mass of silicon oxide were mixed and the mixture was fired at 1200° C. for four hours. The resultant particulate solid was confirmed to be single-phase $Na_4Zr_2Si_3O_{12}$ by X-ray diffractometry.

Synthesis Example 3

An amount of 43.0 parts by mass of potassium carbonate, 38.3 parts by mass of zirconium oxide, and 18.7 parts by mass of silicon oxide were mixed and the mixture was fired at 1200° C. for four hours. The resultant particulate solid was confirmed to be single-phase $K_2ZrSiO_5$ by X-ray diffractometry.

Synthesis Example 4

An amount of 36.2 parts by mass of potassium carbonate, 32.3 parts by mass of zirconium oxide, and 31.5 parts by mass of silicon oxide were mixed and the mixture was fired at 1200° C. for four hours. The resultant particulate solid was confirmed to be single-phase $K_2ZrSi_2O_7$ by X-ray diffractometry.

Synthesis Example 5

An amount of 51.8 parts by mass of cesium carbonate, 19.6 parts by mass of zirconium oxide, and 28.6 parts by mass of silicon oxide were mixed and the mixture was fired at 1200° C. for four hours. The resultant particulate solid was confirmed to be single-phase $Cs_2ZrSi_3O_9$ by X-ray diffractometry.

Synthesis Example 6

An amount of 28.7 parts by mass of lithium carbonate, 47.9 parts by mass of zirconium oxide, and 23.4 parts by mass of silicon oxide were mixed and the mixture was fired at 1200° C. for four hours. The resultant particulate solid was confirmed to be single-phase $Li_2ZrSiO_5$ by X-ray diffractometry.

Synthesis Example 7

An amount of 52.9 parts by mass of potassium carbonate and 47.1 parts by mass of zirconium oxide were mixed and the mixture was fired at 1200° C. for four hours. The resultant particulate solid was confirmed to be single-phase $K_2ZrO_3$ by X-ray diffractometry.

Synthesis Example 8

An amount of 57.5 parts by mass of potassium carbonate and 42.5 parts by mass of aluminum oxide were mixed and the mixture was fired at 1200° C. for four hours. The resultant particulate solid was confirmed to be single-phase $KAlO_2$ by X-ray diffractometry.

Synthesis Example 9

An amount of 38.4 parts by mass of potassium carbonate, 28.3 parts by mass of aluminum oxide, and 33.3 parts by mass of silicon oxide were mixed and the mixture was fired at 1200° C. for four hours. The resultant particulate solid was confirmed to be single-phase $KAlSiO_4$ by X-ray diffractometry.

Synthesis Example 10

An amount of 26.8 parts by mass of potassium carbonate, 11.3 parts by mass of magnesium hydroxide, and 61.9 parts by mass of titanium oxide were mixed and the mixture was fired at 1000° C. for four hours. The resultant particulate solid was confirmed to be single-phase $K_{0.8}Mg_{0.4}Ti_{1.6}O_4$ by X-ray diffractometry.

Synthesis Example 11

An amount of 49.7 parts by mass of potassium carbonate, 28.7 parts by mass of titanium oxide, and 21.6 parts by mass of silicon oxide were mixed and the mixture was fired at 1000° C. for four hours. The resultant particulate solid was confirmed to be single-phase $K_2TiSiO_5$ by X-ray diffractometry.

Synthesis Example 12

An amount of 22.4 parts by mass of potassium carbonate and 77.6 parts by mass of titanium oxide were mixed and the mixture was fired at 1000° C. for four hours. The resultant particulate solid was confirmed to be single-phase $K_2Ti_6O_{13}$ by X-ray diffractometry.

Synthesis Example 13

An amount of 55.5 parts by mass of cesium carbonate, 17.4 parts by mass of aluminum oxide, and 27.2 parts by mass of titanium oxide were mixed and the mixture was fired at 1200° C. for four hours. The resultant particulate solid was confirmed to be single-phase $CsAlTiO_4$ by X-ray diffractometry.

Exhaust Gas Purifying Catalyst Containing Oxide and Cesium Salt

Production of Exhaust Gas Purifying Catalyst

Examples 1 to 19 and Comparative Examples 1 to 31

Used as oxides were oxides synthesized in Synthesis Examples 1 to 13, $CaSiO_3$ (manufactured by Wako Pure Chemical Industries, Ltd., trade name: calcium silicate, powder), CuO (manufactured by Wako Pure Chemical Industries, Ltd., trade name: copper (II) oxide, powder), $Fe_2O_3$ (manufactured by Wako Pure Chemical Industries, Ltd., trade name: iron (III) oxide, powder), $Al_2O_3$ (manufactured by Wako Pure Chemical Industries, Ltd., trade name: aluminum oxide, powder), $TiO_2$ (manufactured by Wako Pure Chemical Industries, Ltd., trade name: titanium (IV) oxide, powder), $SiO_2$ (manufactured by Wako Pure Chemical Industries, Ltd., trade name: silicon dioxide, powder), $Al_2TiO_5$ (manufactured by MARUSU GLAZE, Co., Ltd., trade name: synthetic aluminum titanate, powder), $3Al_2O_3 \cdot 2SiO_2$ (manufactured by Wako Pure Chemical Industries, Ltd., trade name: mullite, powder), and $ZrSiO_4$ (manufactured by Wako Pure Chemical Industries, Ltd., trade name: zirconium silicate, powder).

Used as cesium salts were $Cs_2SO_4$ (manufactured by Wako Pure Chemical Industries, Ltd., trade name: cesium sulfate, powder) and CsCl (manufactured by Wako Pure Chemical Industries, Ltd., trade name: cesium chloride, powder).

An oxide and a cesium salt were weighed in each of the mixture ratios described in Tables 1 and 2 and mixed in a mortar for ten minutes, resulting in an exhaust gas purifying catalyst.

<Evaluation of Exhaust Gas Purifying Catalyst>
(PM Combustion Temperature)

The exhaust gas purifying catalyst obtained in Example 1 was ground in a mortar and 5% by mass carbon black (TOKABLACK #7100F manufactured by Tokai Carbon Co., Ltd.) was added as pseudo-PM to the ground product and mixed therewith in the mortar.

The obtained mixture was measured in terms of TG/DTA using a thermal analyzer (EXSTAR6000 TG/DTA6300 manufactured by Seiko Instruments Inc.) under the conditions of a temperature rise of 10° C./min, an atmosphere of dry air at a rate of 200 ml/min, and a sample amount of 10 mg to determine the temperature at which the rate of mass reduction due to combustion of the carbon black reaches a maximum (the peak temperature of the DTG curve) as a PM combustion temperature. The result is shown in Table 1.

The exhaust gas purifying catalysts obtained in Examples 2 to 19 and Comparative Examples 1 to 8 and the oxides and cesium salts used for preparation of Examples 1 to 14 and Comparative Examples 1 to 8 were also measured in terms of PM combustion temperature in the same manner as in Example 1. The results are shown in Tables 1 to 3.

Furthermore, the exhaust gas purifying catalysts obtained in Examples 2, 3, 10, and 14 were subjected to thermal treatment at 800° C. for five hours as a heat test and measured in terms of PM combustion temperature in the same manner as described above. The result is shown in Table 1.

TABLE 1

| | Oxide | Cesium Salt | Mixture Ratio (Oxide/Cesium Salt) [wt/wt] | PM Combustion Temperature [° C.] | PM Combustion Temperature After Heat Test [° C.] |
|---|---|---|---|---|---|
| Ex. 1 | $Na_2ZrSiO_5$ | $Cs_2SO_4$ | 1 | 436 | |
| Ex. 2 | $Na_4Zr_2Si_3O_{12}$ | $Cs_2SO_4$ | 1 | 443 | 445 |
| Ex. 3 | $K_2ZrSiO_5$ | $Cs_2SO_4$ | 1 | 420 | 419 |
| Ex. 4 | $K_2ZrSi_2O_7$ | $Cs_2SO_4$ | 1 | 436 | |
| Ex. 5 | $Cs_2ZrSi_3O_9$ | $Cs_2SO_4$ | 1 | 443 | |
| Ex. 6 | $Li_2ZrSiO_5$ | $Cs_2SO_4$ | 1 | 459 | |
| Ex. 7 | $K_2ZrO_3$ | $Cs_2SO_4$ | 1 | 444 | |
| Ex. 8 | $KAlO_2$ | $Cs_2SO_4$ | 1 | 473 | |
| Ex. 9 | $KAlSiO_4$ | $Cs_2SO_4$ | 1 | 505 | |
| Ex. 10 | $K_{0.8}Mg_{0.4}Ti_{1.6}O_4$ | $Cs_2SO_4$ | 1 | 442 | 441 |
| Ex. 11 | $K_2TiSiO_5$ | $Cs_2SO_4$ | 1 | 436 | |
| Ex. 12 | $K_2Ti_6O_{13}$ | $Cs_2SO_4$ | 1 | 488 | |
| Ex. 13 | $CsAlTiO_4$ | $Cs_2SO_4$ | 1 | 442 | |
| Ex. 14 | $CaSiO_3$ | $Cs_2SO_4$ | 1 | 475 | 477 |
| Comp. Ex. 1 | $CuO$ | $Cs_2SO_4$ | 1 | 481 | |
| Comp. Ex. 2 | $Fe_2O_3$ | $Cs_2SO_4$ | 1 | 547 | |
| Comp. Ex. 3 | $Al_2O_3$ | $Cs_2SO_4$ | 1 | 525 | |
| Comp. Ex. 4 | $TiO_2$ | $Cs_2SO_4$ | 1 | 546 | |
| Comp. Ex. 5 | $SiO_2$ | $Cs_2SO_4$ | 1 | 539 | |
| Comp. Ex. 6 | $Al_2TiO_5$ | $Cs_2SO_4$ | 1 | 531 | |
| Comp. Ex. 7 | $3Al_2O_3 \cdot 2SiO_2$ | $Cs_2SO_4$ | 1 | 537 | |
| Comp. Ex. 8 | $ZrSiO_4$ | $Cs_2SO_4$ | 1 | 542 | |

TABLE 2

| | Oxide | Cesium Salt | Mixture Ratio (Oxide/Cesium Salt) [wt/wt] | PM Combustion Temperature [° C.] |
|---|---|---|---|---|
| Ex. 15 | $Na_4Zr_2Si_3O_{12}$ | $CsCl$ | 1 | 445 |
| Ex. 16 | $Na_4Zr_2Si_3O_{12}$ | $Cs_2SO_4$ | 10 | 448 |
| Ex. 17 | $Na_4Zr_2Si_3O_{12}$ | $Cs_2SO_4$ | 2 | 441 |
| Ex. 18 | $Na_4Zr_2Si_3O_{12}$ | $Cs_2SO_4$ | 0.5 | 442 |
| Ex. 19 | $Na_4Zr_2Si_3O_{12}$ | $Cs_2SO_4$ | 0.25 | 450 |

TABLE 3

| | Oxide | Cesium Salt | PM Combustion Temperature [° C.] |
|---|---|---|---|
| Comp. Ex. 9 | $Na_2ZrSiO_5$ | — | 480 |
| Comp. Ex. 10 | $Na_4Zr_2Si_3O_{12}$ | — | 483 |
| Comp. Ex. 11 | $K_2ZrSiO_5$ | — | 461 |
| Comp. Ex. 12 | $K_2ZrSi_2O_7$ | — | 475 |
| Comp. Ex. 13 | $Cs_2ZrSi_3O_9$ | — | 479 |
| Comp. Ex. 14 | $Li_2ZrSiO_5$ | — | 502 |
| Comp. Ex. 15 | $K_2ZrO_3$ | — | 483 |
| Comp. Ex. 16 | $KAlO_2$ | — | 512 |
| Comp. Ex. 17 | $KAlSiO_4$ | — | 558 |
| Comp. Ex. 18 | $K_{0.8}Mg_{0.4}Ti_{1.6}O_4$ | — | 480 |
| Comp. Ex. 19 | $K_2TiSiO_5$ | — | 471 |
| Comp. Ex. 20 | $K_2Ti_6O_{13}$ | — | 574 |
| Comp. Ex. 21 | $CsAlTiO_4$ | — | 477 |
| Comp. Ex. 22 | $CaSiO_3$ | — | 621 |
| Comp. Ex. 23 | $CuO$ | — | 500 |
| Comp. Ex. 24 | $Fe_2O_3$ | — | 559 |
| Comp. Ex. 25 | $Al_2O_3$ | — | 597 |
| Comp. Ex. 26 | $TiO_2$ | — | 645 |
| Comp. Ex. 27 | $SiO_2$ | — | 645 |
| Comp. Ex. 28 | $Al_2TiO_5$ | — | 656 |
| Comp. Ex. 29 | $3Al_2O_3 \cdot 2SiO_2$ | — | 651 |
| Comp. Ex. 30 | $ZrSiO_4$ | — | 656 |
| Comp. Ex. 31 | — | $Cs_2SO_4$ | 517 |

Examples 1 to 14 exhibited lower PM combustion temperatures than the PM combustion temperatures of the oxides and the cesium salt as source materials (Comparative Examples 9 to 22 and 31). In contrast, Comparative Examples 2 to 8 exhibited higher PM combustion temperatures than the cesium salt as a source material (Comparative Example 31). It can be seen from these facts that the exhaust gas purifying catalyst according to the present invention can provide high catalytic activity from the synergy of an oxide having a particular composition and a cesium salt. Furthermore, it can be seen that the exhaust gas purifying catalyst according to the present invention can provide higher catalytic activity than Comparative Example 1, despite no use of any metal oxide variable in valence as in Comparative Example 1.

Production of Exhaust Gas Purification Filter

Example 20

Compounded into 20 parts by mass of $Na_4Zr_2Si_3O_{12}$ obtained in Synthesis Example 2 were 80 parts by mass of aluminum titanate (manufactured by MARUSU GLAZE, Co., Ltd.), 10 parts by mass of graphite, 10 parts by mass of methylcellulose, and 0.5 parts by mass of fatty acid soap. A suitable amount of water was also added to the mixture and the mixture was then kneaded to obtain an extrudable clay.

The obtained clay was extruded and formed into a honeycomb structure by an extruder to obtain a green body. The cell density of the die was 300 cells/in.$^2$ (46.5 cells/cm$^2$) and the partition thickness was 300 μm.

A slurry was prepared the solid of which was substantially made of aluminum titanate (manufactured by MARUSU GLAZE, Co., Ltd.) and $Na_4Zr_2Si_3O_{12}$ obtained in Synthesis Example 2 and to which an additive, such as a viscosity modifier, was added. The ratio of the solid in the slurry is the same as described above.

This slurry was applied in some of the cells of the green body having a honeycomb structure to seal some of the cell openings so that the open cells and sealed cells of the honeycomb structure gave a checkered pattern.

The resultant green body was fired by holding it at 600° C. for 10 hours, then raising the temperature to 1000° C. at a rate of 25° C./h, and holding it at 1000° C. for 10 hours, resulting in a honeycomb structure.

Next, a solution was prepared in which 20 parts by mass of $Cs_2SO_4$ (manufactured by Wako Pure Chemical Industries, Ltd., trade name: cesium sulfate, powder) and 80 parts by mass of water were mixed. The honeycomb structure obtained as above was impregnated with the prepared solution. After the impregnation, the honeycomb structure was fired at 800° C. for five hours to produce an exhaust gas purification filter.

Figure 2:
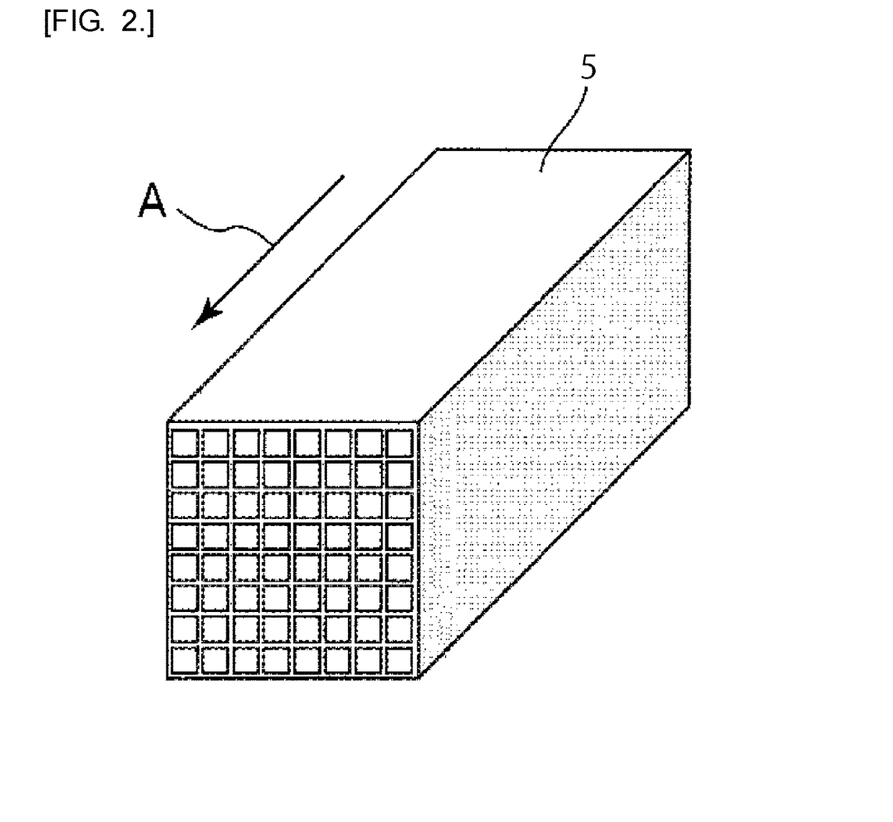
FIG. 2 is a schematic perspective view showing an exhaust gas purification filter produced in an example according to the present invention.

FIG. 2 is a schematic perspective view showing the produced exhaust gas purification filter 5. In FIG. 2, the arrow A represents the direction of extrusion. The amount of $Cs_2SO_4$ supported on the exhaust gas purification filter was 5 parts by mass relative to 20 parts by mass of $Na_4Zr_2Si_3O_{12}$.

Comparative Example 32

Compounded into 20 parts by mass of $Na_4Zr_2Si_3O_{12}$ obtained in Synthesis Example 2 were 80 parts by mass of aluminum titanate (manufactured by MARUSU GLAZE, Co., Ltd.), 10 parts by mass of graphite, 10 parts by mass of methylcellulose, and 0.5 parts by mass of fatty acid soap. A suitable amount of water was also added to the mixture and the mixture was then kneaded to obtain an extrudable clay.

The obtained clay was extruded and formed into a honeycomb structure by an extruder to obtain a green body. The cell density of the die was 300 cells/in.$^2$ (46.5 cells/cm$^2$) and the partition thickness was 300 μm.

A slurry was prepared the solid of which was substantially made of aluminum titanate (manufactured by MARUSU GLAZE, Co., Ltd.) and $Na_4Zr_2Si_3O_{12}$ obtained in Synthesis Example 2 and to which an additive, such as a viscosity modifier, was added. The ratio of the solid in the slurry is the same as described above.

This slurry was applied in some of the cells of the green body having a honeycomb structure to seal some of the cell openings so that the open cells and sealed cells of the honeycomb structure gave a checkered pattern.

The resultant green body was fired by holding it at 600° C. for 10 hours, then raising the temperature to 1000° C. at a rate of 25° C./h, and holding it at 1000° C. for 10 hours, resulting in an exhaust gas purification filter.

Comparative Example 33

Compounded were 100 parts by mass of aluminum titanate (manufactured by MARUSU GLAZE, Co., Ltd.), 10 parts by mass of graphite, 10 parts by mass of methylcellulose, and 0.5 parts by mass of fatty acid soap. A suitable amount of water was also added to the mixture and the mixture was then kneaded to obtain an extrudable clay.

The obtained clay was extruded and formed into a honeycomb structure by an extruder to obtain a green body. The cell density of the die was 300 cells/in.$^2$ (46.5 cells/cm$^2$) and the partition thickness was 300 μm.

A slurry was prepared the solid of which was substantially made of aluminum titanate (manufactured by MARUSU GLAZE, Co., Ltd.) and to which an additive, such as a viscosity modifier, was added.

This slurry was applied in some of the cells of the green body having a honeycomb structure to seal some of the cell openings so that the open cells and sealed cells of the honeycomb structure gave a checkered pattern.

The resultant green body was fired by holding it at 600° C. for 10 hours, then raising the temperature to 1450° C. at a rate of 25° C./h, and holding it at 1450° C. for 10 hours, resulting in a honeycomb structure.

Next, a solution was prepared in which 20 parts by mass of $Cs_2SO_4$ (manufactured by Wako Pure Chemical Industries, Ltd., trade name: cesium sulfate, powder) and 80 parts by mass of water were mixed. The honeycomb structure obtained as above was impregnated with the prepared solution. After the impregnation, the honeycomb structure was fired at 800° C. for five hours to produce an exhaust gas purification filter.

The amount of $Cs_2SO_4$ supported on the exhaust gas purification filter was 5 parts by mass relative to 100 parts by mass of aluminum titanate.

Comparative Example 34

Compounded were 100 parts by mass of aluminum titanate (manufactured by MARUSU GLAZE, Co., Ltd.), 10 parts by mass of graphite, 10 parts by mass of methylcellulose, and 0.5 parts by mass of fatty acid soap. A suitable amount of water was also added to the mixture and the mixture was then kneaded to obtain an extrudable clay.

The obtained clay was extruded and formed into a honeycomb structure by an extruder to obtain a green body. The cell density of the die was 300 cells/in.$^2$ (46.5 cells/cm$^2$) and the partition thickness was 300 μm.

A slurry was prepared the solid of which was substantially made of aluminum titanate (manufactured by MARUSU GLAZE, Co., Ltd.) and to which an additive, such as a viscosity modifier, was added.

This slurry was applied in some of the cells of the green body having a honeycomb structure to seal some of the cell openings so that the open cells and sealed cells of the honeycomb structure gave a checkered pattern.

The resultant green body was fired by holding it at 600° C. for 10 hours, then raising the temperature to 1450° C. at a rate of 25° C./h, and holding it at 1450° C. for 10 hours, resulting in an exhaust gas purification filter.

<Evaluation of Exhaust Gas Purification Filter>

For evaluations, the resultant exhaust gas purification filter was subjected to a regeneration test in the following manner.

(Filter Regeneration Rate)

The initial weight of the exhaust gas purification filter was previously measured and an oxidation catalyst (DOC) and the exhaust gas purification filter were placed in this order in an exhaust line of a diesel engine. After the placement, the diesel engine was started, a specific amount (approximately 8 g/L) of PM was deposited on the filter under the operating condition in which the exhaust temperature became low, the exhaust gas purification filter was then removed from the exhaust line, and the weight of PM deposited was measured.

Next, the exhaust gas purification filter on which PM was deposited was placed in the exhaust line for the simulant exhaust gases, then the simulant exhaust gases were raised to 480° C., and a regeneration test was started. For 30 minutes after the exhaust temperature reached 480° C., the filter was held at a temperature of 480° C.±10° C. After a lapse of 30 minutes, the total amount of the pseudo-exhaust gases was changed to nitrogen gas.

After the temperature dropped to room temperature, the exhaust gas purification filter was removed again and its weight reduction (i.e., the weight of PM combusted) was measured. The result is shown in Table 4.

The regeneration rate was calculated from the calculation formula below.

Regeneration rate (%)=100−[(weight of PM deposited (g) minus weight of PM combusted (g))/weight of PM deposited (g)]×100.

TABLE 4

| | Oxide | Cesium Salt | Regeneration Rate [%] |
|---|---|---|---|
| Ex. 20 | $Na_4Zr_2Si_3O_{12}$ | $Cs_2SO_4$ | 88 |
| Comp. Ex. 32 | $Na_4Zr_2Si_3O_{12}$ | — | 41 |
| Comp. Ex. 33 | — | $Cs_2SO_4$ | 12 |
| Comp. Ex. 34 | — | — | 9 |

It can be seen from Table 4 that as compared to Comparative Examples 32 to 34 in which one of $Na_4Zr_2Si_3O_{12}$ and cesium sulfate was supported alone or none of them was supported, Example 20 in which both of $Na_4Zr_2Si_3O_{12}$ and cesium sulfate were present can provide a high regeneration rate.

Exhaust Gas Purifying Catalyst Containing Oxide, Potassium Salt, and Cesium Salt Production of Exhaust Gas Purifying Catalyst Examples 21 to 40 and Comparative Examples 35 to 69

Used as oxides were oxides synthesized in Synthesis Examples 1 to 13, $CaSiO_3$ (manufactured by Wako Pure Chemical Industries, Ltd., trade name: calcium silicate, powder), CuO (manufactured by Wako Pure Chemical Industries, Ltd., trade name: copper (II) oxide, powder), $Fe_2O_3$ (manufactured by Wako Pure Chemical Industries, Ltd., trade name: iron (III) oxide, powder), $Al_2O_3$ (manufactured by Wako Pure Chemical Industries, Ltd., trade name: aluminum oxide, powder), $TiO_2$ (manufactured by Wako Pure Chemical Industries, Ltd., trade name: titanium (IV) oxide, powder), $SiO_2$ (manufactured by Wako Pure Chemical Industries, Ltd., trade name: silicon dioxide, powder), $Al_2TiO_5$ (manufactured by MARUSU GLAZE, Co., Ltd., trade name: synthetic aluminum titanate, powder), $3Al_2O_3 \cdot 2SiO_2$ (manufactured by Wako Pure Chemical Industries, Ltd., trade name: mullite, powder), and $ZrSiO_4$ (manufactured by Wako Pure Chemical Industries, Ltd., trade name: zirconium silicate, powder).

Used as potassium salts were $K_2SO_4$ (manufactured by Wako Pure Chemical Industries, Ltd., trade name: potassium sulfate, powder) and KCl (manufactured by Wako Pure Chemical Industries, Ltd., trade name: potassium chloride, powder).

Used as cesium salts were $Cs_2SO_4$ (manufactured by Wako Pure Chemical Industries, Ltd., trade name: cesium sulfate, powder) and CsCl (manufactured by Wako Pure Chemical Industries, Ltd., trade name: cesium chloride, powder).

An oxide, a potassium salt, and a cesium salt were weighed in each of the mixture ratios described in Tables 1 and 2 and mixed in a mortar for ten minutes, resulting in an exhaust gas purifying catalyst.

<Evaluation of Exhaust Gas Purifying Catalyst>

(PM Combustion Temperature)

The exhaust gas purifying catalyst obtained in Example 21 was ground in a mortar and 5% by mass carbon black (TOKABLACK #7100F manufactured by Tokai Carbon Co., Ltd.) was added as pseudo-PM to the ground product and mixed therewith in the mortar.

The obtained mixture was measured in terms of TG/DTA using a thermal analyzer (EXSTAR6000 TG/DTA6300 manufactured by Seiko Instruments Inc.) under the conditions of a temperature rise of 10° C./min, an atmosphere of dry air at a rate of 200 ml/min, and a sample amount of 10 mg to determine the temperature at which the rate of mass reduction due to combustion of the carbon black reaches a maximum (the peak temperature of the DTG curve) as a PM combustion temperature. The result is shown in Table 5.

The exhaust gas purifying catalysts obtained in Examples 22 to 40 and Comparative Examples 35 to 45 and the oxides, potassium salts, and cesium salts (Comparative Examples 46 to 69) used for preparation of Examples 21 to 34 and Comparative Examples 35 to 42 were also measured in terms of PM combustion temperature in the same manner as in Example 21. The results are shown in Tables 5 to 7.

Furthermore, the exhaust gas purifying catalysts obtained in Examples 22, 23, 30, and 34 were subjected to thermal treatment at 800° C. for five hours as a heat test and measured in terms of PM combustion temperature in the same manner as described above. The result is shown in Table 5.

TABLE 5

| | Oxide | Potassium Salt | Cesium Salt | Mixture Ratio (Oxide/(Potassium Salt + Cesium Salt)) [wt/wt] | Mixture Ratio (Potassium Salt/ Cesium Salt) [wt/wt] | PM Combustion Temperature [° C.] | PM Combustion Temperature After Heat Test [° C.] |
|---|---|---|---|---|---|---|---|
| Ex. 21 | $Na_2ZrSiO_5$ | $K_2SO_4$ | $Cs_2SO_4$ | 1 | 1 | 405 | |
| Ex. 22 | $Na_4Zr_2Si_3O_{12}$ | $K_2SO_4$ | $Cs_2SO_4$ | 1 | 1 | 414 | 416 |
| Ex. 23 | $K_2ZrSiO_5$ | $K_2SO_4$ | $Cs_2SO_4$ | 1 | 1 | 388 | 389 |
| Ex. 24 | $K_2ZrSi_2O_7$ | $K_2SO_4$ | $Cs_2SO_4$ | 1 | 1 | 411 | |
| Ex. 25 | $Cs_2ZrSi_3O_9$ | $K_2SO_4$ | $Cs_2SO_4$ | 1 | 1 | 413 | |
| Ex. 26 | $Li_2ZrSiO_5$ | $K_2SO_4$ | $Cs_2SO_4$ | 1 | 1 | 435 | |
| Ex. 27 | $K_2ZrO_3$ | $K_2SO_4$ | $Cs_2SO_4$ | 1 | 1 | 418 | |
| Ex. 28 | $KAlO_2$ | $K_2SO_4$ | $Cs_2SO_4$ | 1 | 1 | 448 | |
| Ex. 29 | $KAlSiO_4$ | $K_2SO_4$ | $Cs_2SO_4$ | 1 | 1 | 483 | |
| Ex. 30 | $K_{0.8}Mg_{0.4}Ti_{1.6}O_4$ | $K_2SO_4$ | $Cs_2SO_4$ | 1 | 1 | 415 | 413 |
| Ex. 31 | $K_2TiSiO_5$ | $K_2SO_4$ | $Cs_2SO_4$ | 1 | 1 | 407 | |
| Ex. 32 | $K_2Ti_8O_{13}$ | $K_2SO_4$ | $Cs_2SO_4$ | 1 | 1 | 467 | |
| Ex. 33 | $CsAlTiO_4$ | $K_2SO_4$ | $Cs_2SO_4$ | 1 | 1 | 414 | |
| Ex. 34 | $CaSiO_3$ | $K_2SO_4$ | $Cs_2SO_4$ | 1 | 1 | 453 | 454 |
| Comp. Ex. 35 | $CuO$ | $K_2SO_4$ | $Cs_2SO_4$ | 1 | 1 | 471 | |
| Comp. Ex. 36 | $Fe_2O_3$ | $K_2SO_4$ | $Cs_2SO_4$ | 1 | 1 | 544 | |
| Comp. Ex. 37 | $Al_2O_3$ | $K_2SO_4$ | $Cs_2SO_4$ | 1 | 1 | 533 | |
| Comp. Ex. 38 | $TiO_2$ | $K_2SO_4$ | $Cs_2SO_4$ | 1 | 1 | 551 | |
| Comp. Ex. 39 | $SiO_2$ | $K_2SO_4$ | $Cs_2SO_4$ | 1 | 1 | 543 | |
| Comp. Ex. 40 | $Al_2TiO_5$ | $K_2SO_4$ | $Cs_2SO_4$ | 1 | 1 | 535 | |
| Comp. Ex. 41 | $3Al_2O_3 \cdot 2SiO_2$ | $K_2SO_4$ | $Cs_2SO_4$ | 1 | 1 | 542 | |
| Comp. Ex. 42 | $ZrSiO_4$ | $K_2SO_4$ | $Cs_2SO_4$ | 1 | 1 | 546 | |
| Comp. Ex. 43 | $Na_4Zr_2Si_3O_{12}$ | $K_2SO_4$ | — | 1 | — | 472 | |
| Comp. Ex. 44 | $Na_4Zr_2Si_3O_{12}$ | — | $Cs_2SO_4$ | 1 | — | 443 | |
| Comp. Ex. 45 | — | $K_2SO_4$ | $Cs_2SO_4$ | — | 1 | 532 | |

TABLE 6

| | Oxide | Potassium Salt | Cesium Salt | Mixture Ratio (Oxide/(Potassium Salt + Cesium Salt)) [wt/wt] | Mixture Ratio (Potassium Salt/Cesium Salt) [wt/wt] | PM Combustion Temperature [° C.] |
|---|---|---|---|---|---|---|
| Ex. 35 | $Na_4Zr_2Si_3O_{12}$ | $K_2SO_4$ | $Cs_2SO_4$ | 1 | 10 | 418 |
| Ex. 36 | $Na_4Zr_2Si_3O_{12}$ | $K_2SO_4$ | $Cs_2SO_4$ | 1 | 2 | 410 |
| Ex. 37 | $Na_4Zr_2Si_3O_{12}$ | $K_2SO_4$ | $Cs_2SO_4$ | 1 | 0.5 | 414 |
| Ex. 38 | $Na_4Zr_2Si_3O_{12}$ | $K_2SO_4$ | $Cs_2SO_4$ | 1 | 0.25 | 415 |
| Ex. 39 | $Na_4Zr_2Si_3O_{12}$ | $K_2SO_4$ | $Cs_2SO_4$ | 10 | 1 | 417 |
| Ex. 40 | $Na_4Zr_2Si_3O_{12}$ | $KCl$ | $CsCl$ | 1 | 1 | 416 |

TABLE 7

| | Oxide | Potassium Salt | Cesium Salt | PM Combustion Temperature [° C.] |
|---|---|---|---|---|
| Comp. Ex. 46 | $Na_2ZrSiO_5$ | — | — | 480 |
| Comp. Ex. 47 | $Na_4Zr_2Si_3O_{12}$ | — | — | 483 |
| Comp. Ex. 48 | $K_2ZrSiO_5$ | — | — | 461 |
| Comp. Ex. 49 | $K_2ZrSi_2O_7$ | — | — | 475 |
| Comp. Ex. 50 | $Cs_2ZrSi_3O_9$ | — | — | 479 |
| Comp. Ex. 51 | $Li_2ZrSiO_5$ | — | — | 502 |
| Comp. Ex. 52 | $K_2ZrO_3$ | — | — | 483 |
| Comp. Ex. 53 | $KAlO_2$ | — | — | 512 |
| Comp. Ex. 54 | $KAlSiO_4$ | — | — | 558 |
| Comp. Ex. 55 | $K_{0.8}Mg_{0.4}Ti_{1.6}O_4$ | — | — | 480 |
| Comp. Ex. 56 | $K_2TiSiO_5$ | — | — | 471 |
| Comp. Ex. 57 | $K_2Ti_6O_{13}$ | — | — | 574 |
| Comp. Ex. 58 | $CsAlTiO_4$ | — | — | 477 |
| Comp. Ex. 59 | $CaSiO_3$ | — | — | 621 |
| Comp. Ex. 60 | $CuO$ | — | — | 500 |
| Comp. Ex. 61 | $Fe_2O_3$ | — | — | 559 |
| Comp. Ex. 62 | $Al_2O_3$ | — | — | 597 |
| Comp. Ex. 63 | $TiO_2$ | — | — | 645 |
| Comp. Ex. 64 | $SiO_2$ | — | — | 645 |
| Comp. Ex. 65 | $Al_2TiO_5$ | — | — | 656 |
| Comp. Ex. 66 | $3Al_2O_3 \cdot 2SiO_2$ | — | — | 651 |
| Comp. Ex. 67 | $ZrSiO_4$ | — | — | 656 |
| Comp. Ex. 68 | — | $K_2SO_4$ | — | 527 |
| Comp. Ex. 69 | — | — | $Cs_2SO_4$ | 517 |

Examples 21 to 34 exhibited lower PM combustion temperatures than the PM combustion temperatures of the oxides, the potassium salt, and the cesium salt as source materials (Comparative Examples 46 to 59, 68, and 69) and the combination of the potassium salt and the cesium salt (Comparative Example 45). In contrast, Comparative Examples 36 to 42 exhibited higher PM combustion temperatures than the potassium salt and the cesium salt as source materials (Comparative Examples 68 and 69) and the combination of the potassium salt and the cesium salt (Comparative Example 45). It can be seen from these facts that the exhaust gas purifying catalyst according to the present invention can provide high catalytic activity from the synergy of an oxide having a particular composition, a potassium salt, and a cesium salt. Furthermore, it can be seen that by the copresence of three types of source materials, i.e., an oxide having a particular composition, a potassium salt, and a cesium salt (Example 22), high synergy can be obtained as compared to the case of the copresence of two types of source materials, i.e., an oxide having a particular composition and a potassium salt or a cesium salt (Comparative Examples 43 and 44). Moreover, it can be seen that the exhaust gas purifying catalyst according to the present invention can provide higher catalytic activity than Comparative Example 35, despite no use of any metal oxide variable in valence as in Comparative Example 35.

Production of Exhaust Gas Purification Filter

Example 41

Compounded into 20 parts by mass of $Na_4Zr_2Si_3O_{12}$ obtained in Synthesis Example 2 were 80 parts by mass of aluminum titanate (manufactured by MARUSU GLAZE, Co., Ltd.), 10 parts by mass of graphite, 10 parts by mass of methylcellulose, and 0.5 parts by mass of fatty acid soap. A suitable amount of water was also added to the mixture and the mixture was then kneaded to obtain an extrudable clay.

The obtained clay was extruded and formed into a honeycomb structure by an extruder to obtain a green body. The cell density of the die was 300 cells/in.$^2$ (46.5 cells/cm$^2$) and the partition thickness was 300 μm.

A slurry was prepared the solid of which was substantially made of aluminum titanate (manufactured by MARUSU GLAZE, Co., Ltd.) and $Na_4Zr_2Si_3O_{12}$ obtained in Synthesis Example 2 and to which an additive, such as a viscosity modifier, was added. The ratio of the solid in the slurry is the same as described above.

This slurry was applied in some of the cells of the green body having a honeycomb structure to seal some of the cell openings so that the open cells and sealed cells of the honeycomb structure gave a checkered pattern.

The resultant green body was fired by holding it at 600° C. for 10 hours, then raising the temperature to 1000° C. at a rate of 25° C./h, and holding it at 1000° C. for 10 hours, resulting in a honeycomb structure.

Next, a solution (impregnation solution) was prepared in which 10 parts by mass of $K_2SO_4$ (manufactured by Wako Pure Chemical Industries, Ltd., trade name: potassium sulfate, powder) and 10 parts by mass of $Cs_2SO_4$ (manufactured by Wako Pure Chemical Industries, Ltd., trade name: cesium sulfate, powder), and 80 parts by mass of water were mixed. The honeycomb structure obtained as above was impregnated with the prepared solution. After the impregnation, the honeycomb structure was fired at 800° C. for five hours to produce an exhaust gas purification filter.

FIG. 2 is a perspective view showing the produced exhaust gas purification filter 5. In FIG. 2, the arrow A represents the direction of extrusion. The total amount of $K_2SO_4$ and $Cs_2SO_4$ supported on the exhaust gas purification filter was 5 parts by mass relative to 20 parts by mass of $Na_4Zr_2Si_3O_{12}$.

Comparative Example 70

An exhaust gas purification filter was produced in the same manner as in Example 41 except that the impregnation solution was a solution in which 20 parts by mass of $Cs_2SO_4$ (manufactured by Wako Pure Chemical Industries, Ltd., trade name: cesium sulfate, powder) and 80 parts by mass of water were mixed. The amount of $Cs_2SO_4$ supported on the exhaust gas purification filter was 5 parts by mass relative to 20 parts by mass of $Na_4Zr_2Si_3O_{12}$.

Comparative Example 71

An exhaust gas purification filter was produced in the same manner as in Example 41 except that the impregnation step was not performed and neither potassium salt nor cesium salt was supported on the filter.

Comparative Example 72

Compounded were 100 parts by mass of aluminum titanate (manufactured by MARUSU GLAZE, Co., Ltd.), 10 parts by mass of graphite, 10 parts by mass of methylcellulose, and 0.5 parts by mass of fatty acid soap. A suitable amount of water was also added to the mixture and the mixture was then kneaded to obtain an extrudable clay.

The obtained clay was extruded and formed into a honeycomb structure by an extruder to obtain a green body. The cell density of the die was 300 cells/in.$^2$ (46.5 cells/cm$^2$) and the partition thickness was 300 μm.

A slurry was prepared the solid of which was substantially made of aluminum titanate (manufactured by MARUSU GLAZE, Co., Ltd.) and to which an additive, such as a viscosity modifier, was added.

This slurry was applied in some of the cells of the green body having a honeycomb structure to seal some of the cell openings so that the open cells and sealed cells of the honeycomb structure gave a checkered pattern.

The resultant green body was fired by holding it at 600° C. for 10 hours, then raising the temperature to 1450° C. at a rate of 25° C./h, and holding it at 1450° C. for 10 hours, resulting in a honeycomb structure.

<Evaluation of Exhaust Gas Purification Filter>

For evaluations, the resultant exhaust gas purification filter was subjected to a regeneration test in the following manner.

(Filter Regeneration Rate)

The initial weight of the exhaust gas purification filter was previously measured and an oxidation catalyst (DOC) and the exhaust gas purification filter were placed in this order in an exhaust line of a diesel engine. After the placement, the diesel engine was started, a specific amount (approximately 8 g/L) of PM was deposited on the filter under the operating condition in which the exhaust temperature became low, the exhaust gas purification filter was then removed from the exhaust line, and the weight of PM deposited was measured.

Next, the exhaust gas purification filter on which PM was deposited was placed in the exhaust line for the simulant exhaust gases, then the simulant exhaust gases were raised to 440° C., and a regeneration test was started. For 30 minutes after the exhaust temperature reached 440° C., the filter was held at a temperature of 440° C.±10° C. After a lapse of 30 minutes, the total amount of the pseudo-exhaust gases was changed to nitrogen gas.

After the temperature dropped to room temperature, the exhaust gas purification filter was removed again and its weight reduction (i.e., the weight of PM combusted) was measured. The result is shown in Table 8.

The regeneration rate was calculated from the calculation formula below.

Regeneration rate (%)=100−[(weight of PM deposited (g) minus weight of PM combusted (g))/weight of PM deposited (g)]×100.

TABLE 8

| | Oxide | Potassium Salt | Cesium Salt | Regeneration Rate[%] |
|---|---|---|---|---|
| Ex. 41 | $Na_4Zr_2Si_3O_{12}$ | $K_2SO_4$ | $Cs_2SO_4$ | 89 |
| Comp. Ex. 70 | $Na_4Zr_2Si_3O_{12}$ | — | $Cs_2SO_4$ | 45 |
| Comp. Ex. 71 | $Na_4Zr_2Si_3O_{12}$ | — | — | 18 |
| Comp. Ex. 72 | — | — | — | 5 |

It can be seen from Table 8 that as compared to Comparative Examples 70 to 72 in which $Na_4Zr_2Si_3O_{12}$ and cesium sulfate were supported, $Na_4Zr_2Si_3O_{12}$ was supported alone or none of them was supported, Example 41 in which $Na_4Zr_2Si_3O_{12}$, potassium sulfate, and cesium sulfate were present together can provide a high regeneration rate even though the regeneration test was performed at a temperature as low as 440° C.

REFERENCE SIGNS LIST

1 . . . exhaust gas purification device
2 . . . source of exhaust gases
3, 4 . . . pipe
5 . . . exhaust gas purification filter
A . . . direction of extrusion of green body

The invention claimed is:

1. An exhaust gas purifying catalyst containing: an oxide containing at least one element (A) selected from alkali metals and alkaline earth metals and at least one element (B) selected from Zr, Si, Al, and Ti; and a cesium salt,
   wherein the cesium salt is at least one selected from cesium sulfate, cesium nitrate, and cesium chloride.

2. The exhaust gas purifying catalyst according to claim 1, having a mixture ratio between the oxide and the cesium salt (oxide/cesium salt) of 0.01 to 100 by mass.

3. The exhaust gas purifying catalyst according to claim 1, further containing a potassium salt.

4. The exhaust gas purifying catalyst according to claim 3, wherein the potassium salt is at least one selected from potassium sulfate, potassium nitrate, potassium carbonate, and potassium chloride.

5. The exhaust gas purifying catalyst according to claim 3, having a mixture ratio between the oxide and the potassium and cesium salts (oxide/(potassium salt+cesium salt)) of 0.01 to 100 by mass.

6. The exhaust gas purifying catalyst according to claim 3, having a mixture ratio between the potassium salt and the cesium salt (potassium salt/cesium salt) of 0.01 to 100 by mass.

7. A method for producing the exhaust gas purifying catalyst according to claim 3, the method comprising mixing and dispersing the oxide, the potassium salt, and the cesium salt.

8. The exhaust gas purifying catalyst according to claim 1, having a molar ratio between the element (A) and the element (B) of the oxide (AB) of a positive real number equal to or greater than ⅛.

9. An exhaust gas purification device comprising the exhaust gas purifying catalyst according to claim 1.

10. An exhaust gas purification filter comprising: a support; and the exhaust gas purifying catalyst according to claim 1, the exhaust gas purifying catalyst being supported on the support.

11. The exhaust gas purification filter according to claim 10, wherein the support is a honeycomb filter.

12. A method for producing the exhaust gas purifying catalyst according to claim 1, the method comprising mixing and dispersing the oxide and the cesium salt.

* * * * *